United States Patent [19]

Peterson et al.

[11] Patent Number: 4,464,862

[45] Date of Patent: Aug. 14, 1984

[54] CHEMICAL APPLICATOR

[75] Inventors: Donald L. Peterson, Martinsburg; William V. Welker, Jr., Charles Town, both of W. Va.

[73] Assignee: The United States of America as represented by the Secretary of Agriculture, Washington, D.C.

[21] Appl. No.: 429,913

[22] Filed: Sep. 30, 1982

[51] Int. Cl.³ .......................................... A01C 23/04
[52] U.S. Cl. ........................................ 47/1.5; 47/1.7
[58] Field of Search .................. 47/1.5, 1.7; 56/15.5, 56/16.2, 11.9; 172/5; 56/10.4

[56] References Cited

U.S. PATENT DOCUMENTS

| 1,672,058 | 6/1928 | Cole | 47/1.5 |
|---|---|---|---|
| 2,749,824 | 6/1956 | Friday | 172/5 |
| 2,851,842 | 9/1958 | Harp | 56/15.5 X |
| 3,053,033 | 9/1962 | Maguire | 56/16.2 X |
| 3,117,632 | 1/1964 | Caggiano | 172/5 |
| 3,212,216 | 8/1965 | Ludwig | 47/1.5 |
| 3,651,600 | 3/1972 | Ewing | 47/1.5 |
| 3,715,872 | 2/1973 | Thompson | 56/10.4 |
| 3,728,817 | 4/1973 | Huey et al. | 47/1.5 X |
| 3,925,927 | 12/1975 | Linton | 47/1.5 |
| 4,187,638 | 2/1980 | Hardy | 47/1.5 |
| 4,197,998 | 4/1980 | Jolly | 47/1.7 X |
| 4,199,896 | 4/1980 | Lehman | 47/1.7 |
| 4,206,580 | 6/1980 | Truax et al. | 56/16.2 X |
| 4,219,964 | 9/1980 | Dale | 47/1.5 |
| 4,223,478 | 9/1980 | McHugh | 47/1.5 |
| 4,291,492 | 9/1981 | Reynolds et al. | 47/1.7 X |
| 4,322,106 | 6/1982 | Barton | 47/1.5 |
| 4,328,640 | 5/1982 | Rewelle | 47/1.5 |

FOREIGN PATENT DOCUMENTS

| 1019004 | 1/1953 | France | 47/1.5 |
|---|---|---|---|
| 2423982 | 12/1979 | France | 47/1.5 |

Primary Examiner—Robert A. Hafer
Assistant Examiner—D. D. DeMille
Attorney, Agent, or Firm—M. Howard Silverstein; William E. Scott; David G. McConnell

[57] ABSTRACT

A rotary applicator for applying herbicides or other chemicals to vegetation is described. The applicator is especially useful for use in fruit orchards, nurseries and around any plant or bush that grows on or from a stem or trunk above ground.

1 Claim, 8 Drawing Figures

CHEMICAL APPLICATOR

BACKGROUND OF THE INVENTION

1. Field of The Invention

This invention relates to an agricultural chemical applicator and more particularly to an apparatus for wiping herbicides onto weeds within a row and around the trunk of trees in orchards.

2. Description of The Art

While other devices are available for applying herbicides and other materials to vegetation of various sorts, most of the available apparatus in this area has been specifically designed to provide means for selectively destroying weeds and such that grow higher than the vegetation of a desired crop. In addition none of the known herbicide applicators are provided with any means for preventing the applicator from coming into contact with the plant or crop that is being protected from undesired weed growth.

SUMMARY OF THE INVENTION

An object of this invention is to provide an improved agricultural chemical applicator.

Another object of this invention is to provide an apparatus which is provided with means by which herbicides can be applied to weeds growing beneath a crop and to weeds which grow in very close proximity to the central stem of the crop while avoiding contact of the herbicides with the crop.

Still another object of this invention is to provide an apparatus with a closed delivery system in which herbicides can be applied to targeted weeds without spraying thus avoiding any spray drift.

A further object of this invention is to provide an apparatus with which herbicides can be applied within a tree or nursery row without contact of the herbicide to any part of the non-targeted plant.

Another further object of this invention is to provide an apparatus in which the means of application of the herbicide is also utilized as a holding reservoir for the herbicide.

Another further object of this invention is to provide an apparatus that utilizes absorbent sponge material in a rotating manifold to wipe herbicides onto undesirable plant material.

Another object of this invention is to provide an apparatus for applying herbicides to undesirable weeds which is provided with means for precisely controlling the height of a rotating wiper member.

A still further object is to provide an apparatus in which the height of the wiper member is adjustable.

According to this invention the above objects are accomplished by an apparatus having a frame with a wiper member mounted on the frame and driving means on the frame connected to the wiper member for rotation of the wiper member about an axis, said wiper member comprising an absorbent pad, a circular or wheel member mounted above the absorbent pad for free-wheeling rotation on the same axis, the diameter of the circular member being larger than the diameter of the absorbent wiping pad and a manifold located within said wiping pad for supplying chemicals to the wiper member. A reservoir for liquid chemicals which is connected to the manifold is also provided. The location of the manifold within the wiper and its direct connection with the chemical reservoir provide a closed system for delivery of chemicals to the wiper member thereby allowing the chemical to be applied to the targeted plants only and avoiding any spray or drift of the chemical to non-targeted plants.

DESCRIPTION OF THE INVENTION

The apparatus of this invention allows the application of chemicals such as herbicides beneath a crop and it is especially useful with crops that grow above ground level such as trees in fruit orchards, nursery crops, and plants such as blueberry bushes. In fact, it is useful in applying herbicides or other chemicals to weeds or growth around any plant or bush that grows on or from a stem or trunk above ground. In the preferred embodiment of this invention the apparatus is usually mounted on the front of a tractor or other mobile means because such placement facilitates mounting and the making of adjustments. The principal components of the apparatus are a wiper member comprised of a wiping pad made of polyurethane foam or other absorbent material, a manifold and a free-wheeling wheel or circular member, a drive means, a support frame, a tractor or mobile means mount, forced tensioning spring and cable and height control means. A manifold can be made from standard tubing or pipe and two types of manifolds have been found to work very satisfactorily, a circular manifold and a cross manifold. The circular manifold has small holes drilled in the circular section of the manifold for dispersing the herbicide to the wiping pad or disc. This manifold is covered by the wiping pad that has sections cut out to match the manifold. The pad is covered with a cloth material that is held in place by a wooden disc above and a wooden disc below the horizontal surfaces of the wiping pad. The bottom wooden disc is smaller in diameter to allow for more surface contact for applying the herbicide to weeds or other chemical to a target plant. The cross manifold has holes drilled along the arms of the two cross pipes, the arms are covered by cylinders made of polyurethane foam or other absorbent material with a hole centered along the horizontal axis to slide over the arms or crossed pipes. The cylinders are covered by cloth sleeves. Both manifolds have a pipe cross at the center to which a pipe coupling is welded so that its longitudinal axis is perpendicular to the plane of the pipe cross. This pipe coupling has a female receptacle into which a connecting pipe is threaded. The free-wheeling wheel or circular member is bearing supported on the connecting pipe and is separated from the manifold by a spacer. The diameter of this circular member or wheel is larger than that of the wiping pad thereby preventing application of chemical or herbicide to a tree trunk or other non-targeted shrub. The connecting pipe then passes through a bearing that is in an integral part of a support frame arm. Above this point a chain drive sprocket is welded to the connecting pipe. At the top of the connecting pipe is a pipe swivel joint which allows the connecting pipe to rotate and provides for the input of the herbicide from the reservoir. A hydraulic motor, drive sprocket, and chain powers the rotating wiper member. All of these components are supported on a frame support arm which is allowed to pivot in a horizontal plane about a horizontal pivot point. As the rotary wiper member approaches a tree or other non-targeted object, the free-wheeling wheel or circular member contacts the tree or object. As the mobile means continues to move forward, the free-wheeling wheel or circular member and support arm pivot about a horizontal pivot point allowing the wheel to circumscribe that side of the trunk of the tree or other object that is closest to the mobile means. As the trunk of the tree or other object is passed the horizontal tension spring pulls the support arm, wiper member and wheel back to its initial position. The tension on the horizontal spring is adjustable to prevent the wheel from being displaced by large weeds while allowing it to move when a more rigid trunk is contacted. Preliminary testing of an earlier embodiment of this invention showed that uneven terrain caused the wiper member to have undesirable height fluctuations with respect to the ground. Therefore, to alleviate this problem, a set of height control wheels are rigidly attached to the support framework for the wiper member. This rigid attachment is to the wiper member side of a vertical pivot point. Since these wheels are positioned in close proximity to the wiper member, the height that the wiper member stays above the ground is precisely controlled. The height of the wheels is adjustable to accommodate different types of terrain.

A hydraulic cylinder attached to the frame is used to lift the height control wheels and wiper member off the ground for turning sharp corners and for transporting the unit to and from the field. One end of the cylinder is attached to the frame that bolts to the tractor while the other end is attached to the frame of the weed wiper mechanism. Flexible chain links allow the height control wheels to move with ground variations when the cylinder is extended. Retraction of the cylinder lifts the wiper member and the height control wheels off the ground by pivoting the frame about the vertical pivot point. The vertical pivot point arrangement consists of two pieces of channel iron positioned back to back and spaced a few inches apart and connected to both the support arm of the height control wheels and the support arm of the wiper member. A bolt through the center of the channel irons and through tubing that bolts to the tractor mounting brackets completes the vertical pivoting arrangement. This pivoting arrangement is stabilized by providing slots in the channel iron and a bolt through these slots and through the tubing that is attached to the tractor mounting brackets.

The speed of the rotating wiper member is variable by conventional hydraulic means. Varying the speed of the wiper member in proportion to the ground speed allows for different application rates, thus allowing more precise control of the targeted plant. The chemical or herbicide to be applied may be supplied to the manifold and the wiper member by different methods, for example, 1. gravity flow from a container at atmospheric pressure, 2. a closed container under pressure, or 3. a conventional pump supply delivery system.

BRIEF DESCRIPTION OF THE DRAWINGS

As shown in FIGS. 1 and 2 the apparatus framework for wiper member 4 is attached to and supported by mounting brackets 16 of mobile unit 3 and is comprised of wiper member support arm 6, vertical pivot support arm 8, height control wheel support arm 10, height control wheels 12, vertical pivot arms 14, pillow block supports 17, pillow blocks 18, and pillow block shaft 20. Vertical pivot arms 14, which can be made from channel iron or other similar or suitable structural material, are welded rigidly to height control wheel support arm 10 and pillow block support sleeve 19 and pivot on bolt 22 which connects arms 14 to arm 8. Slots 24 in pivot arms 14 and bolt 26 in arm 8 provide added stability to the pivoting arrangement. Pillow block support sleeve 19 is welded to the inner surfaces of both vertical pivot arms 14 and extends back almost to bolt 22. Pillow blocks 18 are bolted to pillow block supports 17 which are welded to the forward end of sleeve 19. Pillow block shaft 20 connects pillow blocks 18 thereby becoming a horizontal pivot point and allowing arm 6 and wiper member 4 to pivot horizontally. Hydraulically operated cylinder 28 is mounted on mounting brackets 16 and connected through flexible chain links 30 to pillow block support 17 and provides the means by which wheels 12 and member 4 are lifted off the ground for turning sharp corners and for transporting the apparatus to and from the location being treated. Hydraulic motor 32 mounted on support arm 6 is connected to a power source (not shown) and provides power for chain drive 36 which drives wiper member 4. As shown in more detail in FIGS. 3 and 4, wiper member 4 has a manifold 38, wiping pad 40, discs 42 (only one shown), pad cover 44 and a free-wheeling wheel or circular member 46 located above member 4. Although manifold 38 is shown in FIGS. 3 and 3a in two forms, circular and cross, it can be made in almost any conceivable form provided it distributes herbicide or other liquid solution uniformly to all parts of wiping pad 40. Manifold 38 can be made from standard tubing or pipe or from any other suitable material. As seen in FIGS. 3 and 5b, the circular manifold is provided with cross-pipes 48 through which the liquid solution flows to the circular portion of the manifold. The circular portion of manifold 38 is provided with small holes 39 through which the liquid solution is disbursed to wiping pad 40. In the cross form of 38, FIGS. 3a and 5a, the cross arms are provided with small holes 39 for the same purpose. Wiping pad 40 which can be made of polyurethane foam or other absorbent material has sections cut out of its upper surface corresponding in shape to that of manifold 38 so that 38 can be fitted into pad 40. Pad 40 with fitted-in manifold 38 is covered with pad cover 44 which can be made of cloth or other suitable material. Cover 44 is held in place by discs 42, one of which is on each horizontal surface of pad 40. The disc 42 on the bottom horizontal surface of pad 40, as shown in FIG. 3b, has a smaller diameter than the one on the top surface to allow more surface contact for applying the herbicide or other liquid solution to the targeted plants. Discs 42 can be made of wood or other suitable material. Discs 42 are bolted together by bolts 41 that pass through pad 40 although other methods of holding them in place may be used. In the embodiment with which we demonstrated the efficacy of the invention, bottom disc 42 was external of pad cover 44 while top disc 42 was inside cover 44 which was closed at the top by a drawstring. When cross type manifold 38 is used, each cross arm is covered with a polyurethane foam or other suitable type cylinder having a hole centered along its horizontal axis so that the cylinder can slide over a cross arm and each cylinder is covered with cloth or other suitable material. The center of each type of manifold 38 illustrated herein, that is, where cross pipes 48 cross or where the arms of cross type manifold 38 cross, has, as shown in FIGS. 5a and 5b, a pipe cross 49 which has an opening in the center on the top side of the cross. Pipe coupling 50 which is provided with a female receptacle is welded or otherwise permanently attached to pipe cross 49 over the opening in the center so that when connecting pipe 52 is threaded into coupling 50 its longitudinal axis is perpendicular to the plane of manifold 38 and it becomes a conduit for transporting fluids to manifold 38. In addition to being a conduit for herbicide or other chemical, connecting pipe 52 serves as an axis on which wiper member 4 rotates. As shown in FIG. 4, free-wheeling wheel or circular member 46, which is bearing supported on connecting pipe 52, is positioned and kept a constant distance above manifold 38 by spacer 54. Connecting pipe 52 also passes through a bearing which is an integral part of arm 6 above which pipe 52 is fitted with chain drive sprocket 60. Sprocket 60 is permanently fitted to pipe 52 by a weld or other suitable means. Fitted to the top of pipe 52 is pipe swivel joint 62 which is connected to herbicide or solution feed pipe or hose 64. In operation, as wiper member 4 approaches a tree or other non-targeted object, free-wheeling circular member or wheel 46 contacts the tree trunk or other object thereby preventing the herbicide or chemical on rotating wiping pad 40 from contacting the non-targeted object. As mobile unit 3 continues to move forward, member 46 with wiper member 4 and wiper member support arm 6 pivot about pillow block shaft 20, which constitutes a horizontal pivot point, thereby allowing member 46 to move around or circumscribe one side of the trunk of the tree or other non-targeted object. As soon as wiper member 4 has passed the non-targeted object, support arm 6 and wiper member 4 are pulled back to their initial operating position by horizontal tension spring 66 and cable 68. Spring 66 is attached to bracket 70 on support arm 8 and cable 68 is attached at one end to spring 66 and at the other end to eye bolt 72 on wiper member support arm 6.

Figure 1:
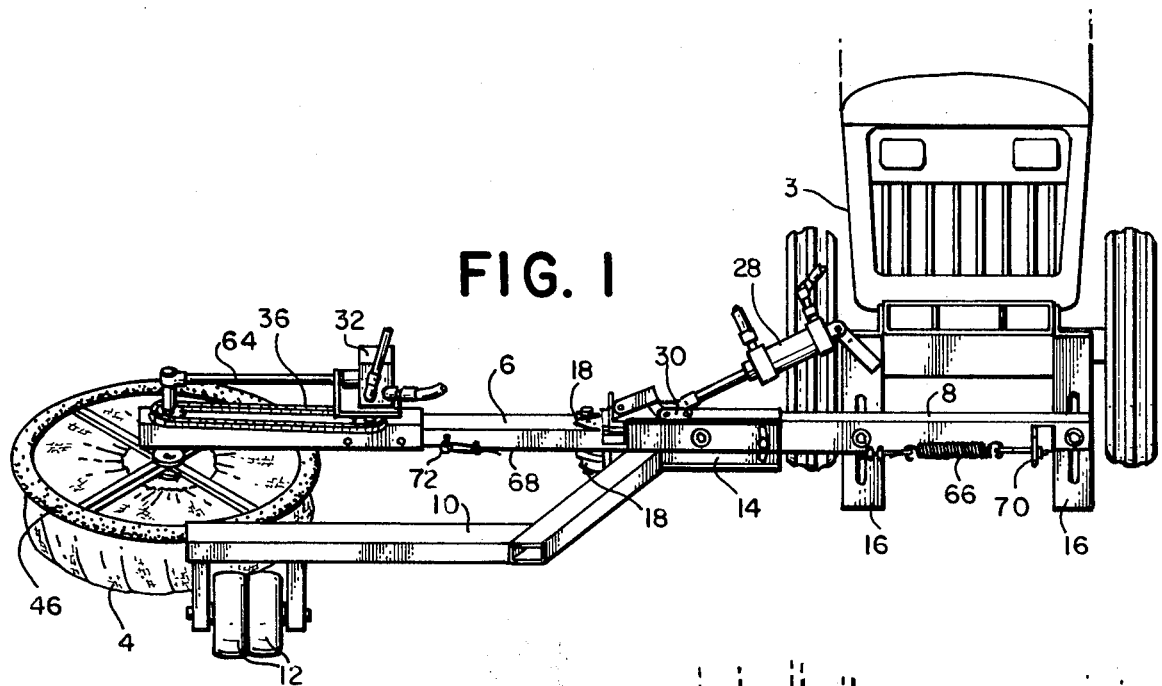
FIG. 1 is a view of the apparatus in operating position.
Figure 2:
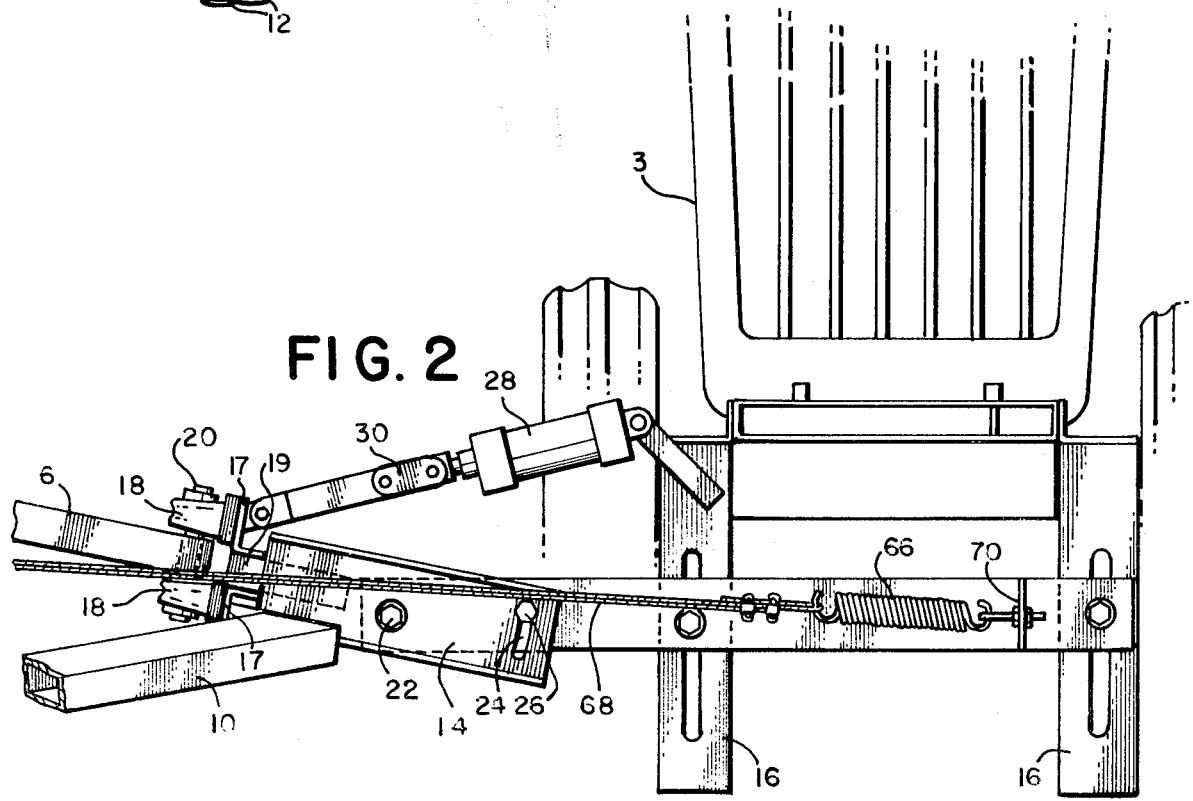
FIG. 2 is a view of the pivoting arrangement.
Figure 3:
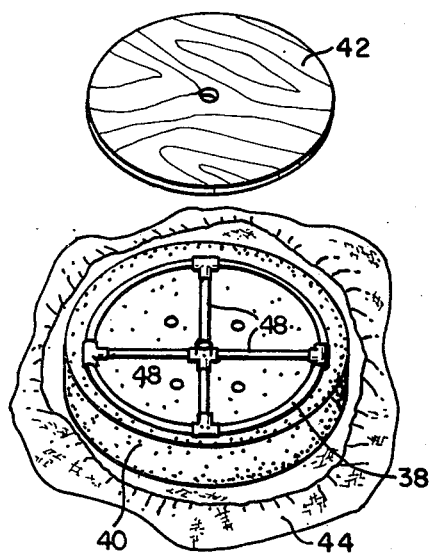
FIGS. 3 and 3a show some of the components of the wiper member.
Figure 3A:
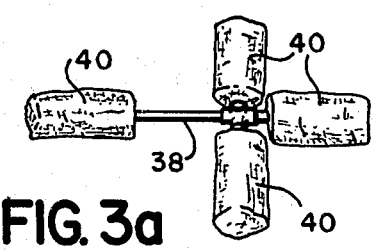
Figure 3B:
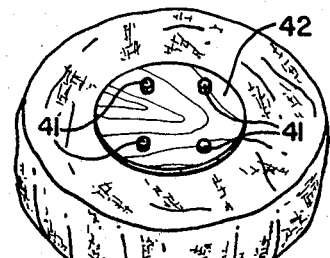
FIG. 3b shows the bottom surface of wiper member and the attachment of the lower disc.
Figure 4:
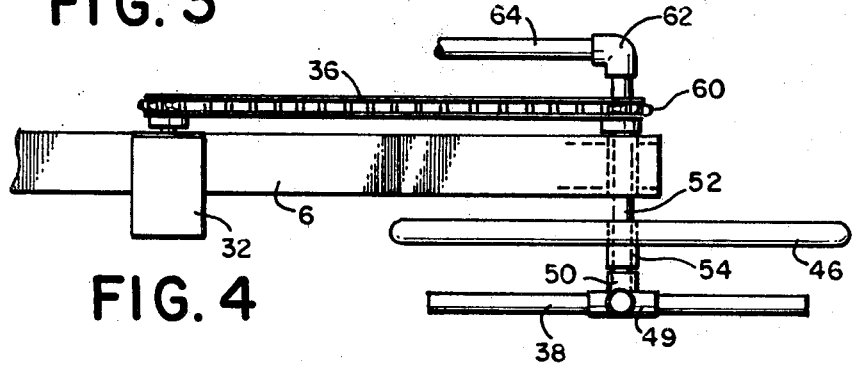
FIG. 4 is a schematic side view of the wiper member part of the apparatus.
Figure 5A:
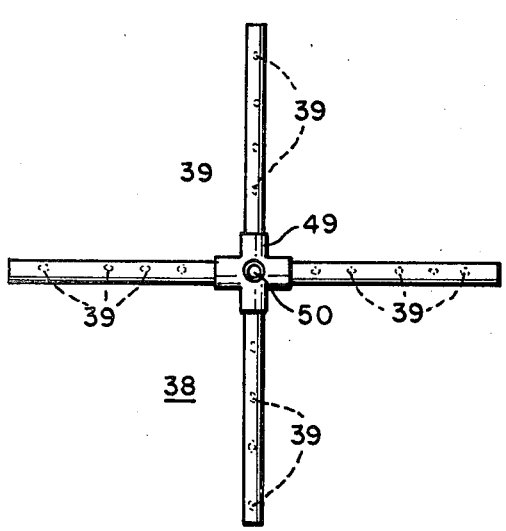
FIGS. 5a and 5b show the pipe cross on the manifolds.
Figure 5B:
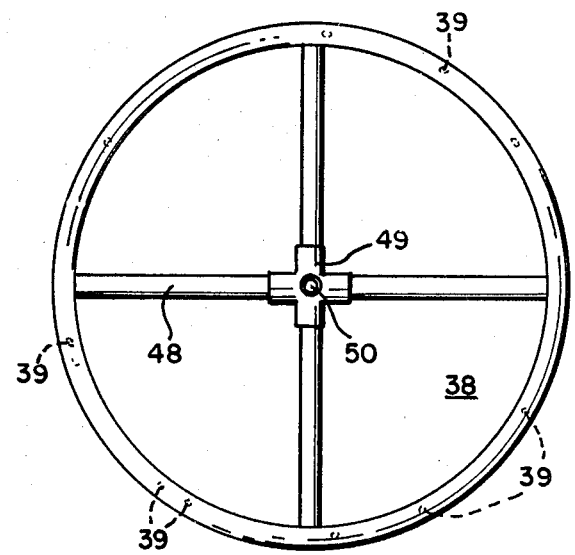

Flexible chain links 30 allow height control wheels 12 to follow variations in ground contour when the piston of cylinder 28 is extended as shown in FIG. 1. When the piston of cylinder 28 is retracted as in FIG. 2, the apparatus pivots vertically on bolt 22 and wiper member 4 and height control wheels 12 are lifted off the ground.

Prior to incorporating wheels 12 into the apparatus, wiper member 4 was found to exhibit undesirable height fluctuations with respect to the ground when used on uneven terrain. Wheels 12 are positioned in close proximity to wiper member 4 allowing the height that member 4 stays above the ground to be precisely controlled. The height of wheels 12 is adjustable. The tension on spring 66 is adjustable to prevent free-wheeling wheel 46 from being displaced by large weeds while allowing it to move when a more rigid tree trunk or non-targeted object is contacted.

We claim:
1. An apparatus for applying chemicals to vegetation comprising;
    (a) a frame;
    (b) a wiper member mounted on said frame, said wiper member comprising an absorbent component, a manifold fitted within the absorbent component for delivering chemicals to said component, and a free-wheeling circular component which is separated from the manifold of the wiper member by a spacer and has a diameter larger than that of the wiper member;
    (c) vertical pivot arms attached to the frame for lifting the wiper member;
    (d) a hydraulic cylinder mounted on the frame for activating the vertical pivot arms, said cylinder being provided with flexible chain links to allow the wiper member to follow the contour of the ground automatically;
    (e) means defining pivot point on the frame to allow the wiper member to pivot around non-targeted objects;
    (f) height adjustable wheels attached to the frame for controlling the height above ground of the wiper member;
    (g) driving means on the frame for rotation of the wiper member; and
    (h) supply means to provide chemicals to the manifold.

* * * * *